3,542,699
CROSSLINKED POLYMERS OF 2-HYDROXY-
ALKYL OR ALKENYL OXAZINES AND
OXAZOLINES
Alan J. Levy and Morton H. Litt, Morristown, N.J., assignors to Allied Chemical Corporation, New York, N.Y., a corporation of New York
No Drawing. Original application Dec. 7, 1966, Ser. No. 599,691. Divided and this application Apr. 2, 1969, Ser. No. 828,053
Int. Cl. C08g 33/02, 33/06
U.S. Cl. 260—2
4 Claims

ABSTRACT OF THE DISCLOSURE

This invention relates to novel crosslinked polymers prepared by polymerizing oxazines and oxazolines having hydroxyl-terminated alkyl or alkenyl groups in the 2-position.

CROSS-REFERENCE TO RELATED APPLICATIONS

This application is a division of copending application Ser. No. 599,691 filed Dec. 7, 1966, and now abandoned.

BACKGROUND OF THE INVENTION

Copending application Ser. No. 382,343 of Litt et al., filed July 13, 1964, now U.S. Pat. No. 3,483,141, issued Dec. 9, 1969, discloses a process for preparing polymers from 2-substituted-2-oxazolines and 2-substituted-5,6-dihydro-1,3,4-oxazines in which the substituents in the 2-position are hydrocarbon or halogenated hydrocarbon radicals. During polymerization the heterocyclic rings open and polymers are formed which are composed essentially of recurring units of the formula

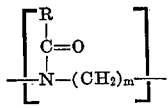

where R is a hydrocarbon or a halogenated hydrocarbon radical and $m$ is an integer of 2 to 3. As ascertained from the above formula, the substituents R do not react during polymerization and the backbone chain of the polymer is linear.

In accordance with the present invention, novel 2-substituted-2-oxazolines and 2-substituted-5,6-dihydro-1,3,4-oxazines have been discovered which contain reactive hydroxy groups in the 2-substituent. These compounds are represented by the formula

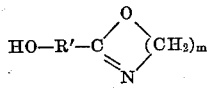

where R' is an alkyl or halogenated alkyl group of 1 to 17 carbon atoms or an alkenyl or halogenated alkenyl group of 4 to 17 carbon atoms, and $m$ is an integer of 2 to 3. Preferably the compounds are primary or secondary alcohols, i.e. the carbon atoms to which the hydroxy group is attached is in turn attached to either oen or two other carbon atoms. The hydroxy groups can be made to react during polymerization to give cross linked polymeric structures such as

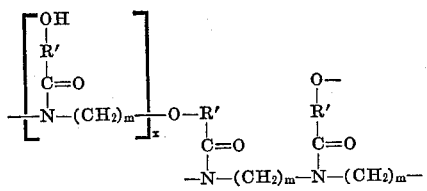

These polymers can be used to form useful coatings, films and molded articles, particularly for polymerization in place, rapid formulation of finished articles. Additionally, as disclosed in U.S. Pat. 3,458,456 issued July 29, 1969, when the compounds of the present invention are added to the monomers of application No. 382,343 (U.S. Pat. No. 3,483,141) in amounts up to 15%, they serve as molecular weight extenders upon polymerization of the system. In the above uses, the hydroxy groups have been found to be very reactive when removed from the heterocyclic ring by at least 3 carbon atoms.

The cyclic iminoethers of the present invention can be prepared by cyclodehydration of their corresponding N-(ω-hydroxyalkyl) amides. These amides have the formula $$HO-R'-\overset{O}{\underset{\|}{C}}-NH(CH_2)_mOH$$

where $m$ has the meaning given above. They can be prepared by reacting an hydroxyalkyl carboxylic acid with an alkanol amine as illustrated in the following equation:

$$HO-R'COOH + H_2N(CH_2)_m-OH \longrightarrow$$
$$HO-R'-\overset{O}{\underset{\|}{C}}-NH(CH_2)_mOH + H_2O$$

Alternatively, when a suitable lactone is available, it can be substituted for the hydroxyalkyl carboxylic acid in the above reaction. This is illustrated in the following reaction where the lactone is caprolactone.

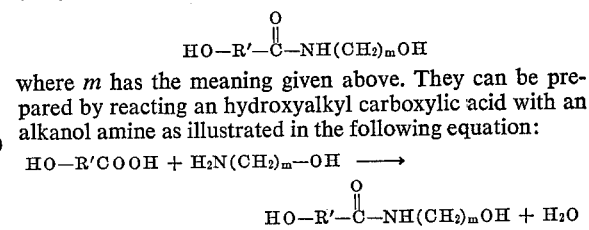

$$HO-(CH_2)_5-\overset{O}{\underset{\|}{C}}-NH(CH_2)_m-OH$$

The preferred method of cyclodehydrating the N-(ω-hydroxyalkyl) amides is to pass these compounds in vapor phase over a silica or alumina-containing catalyst which has been heated to at least 150° C. This procedure is described in detail in our copending U.S. patent application Ser. No. 382,342, filed July 13, 1964. The cyclodehydration can also be effected with sulfuric acid in accordance with known procedures.

The cyclic iminoethers of this invention can be polymerized in the presence of a cationic catalyst such as alkyl halides, boron-fluorine compounds, antimony-fluorine compounds, strong acids, salts of strong acids with an oxazoline or an oxazine, esters of strong acids, strongly acidic ion exchange resins and acid-activated clays. Illustrative of suitable catalysts are methyl iodide; 1,4-dibromobutane; boron trifluoride etherate; antimony pentafluoride; p-toluene sulfonic acid; dimethyl sulfate; sulfuric acid; nitric acid; perchloric acid; hydrobromic acid; hydroiodic acid; methyl sulfate; methyl p-toluene sulfonate; salts of 2-phenyl-2-oxazines with perchloric acid, hydroiodic acid and toluene sulfonic acid and the perchlorate salt of 2-(p-chlorophenyl)-2-oxazoline. The temperature at which the polymerization is carried out may range from about 25° to 250° C. with a preferable temperature range being from about 80° to 200° C. The time required to polymerize the monomer can vary from several minutes to several days depending on the reactants, temperature, the particular monomer used, the catalyst employed, the monomer-to-catalyst ratio, and the desired molecular weight. In general, it is preferred to employ a molar ratio of about 10 to 60,000 mols of monomer per mol of catalyst.

The following examples are given to further illustrate the invention, but it is to be understood that the invention is not to be limited in any way by the details described therein. In the examples parts are by weight and percent is by weight.

EXAMPLE 1

152 parts of glycolic acid, 134.2 parts of ethanolamine and 45 parts of xylene were charged to a flask and heated to reflux. The water produced by the reaction and the solvent were distilled off. 245.3 parts of a gray-green viscous liquid was obtained which solidified after standing for one week.

The product was recrystallized from acetonitrile and N-(β-hydroxyethyl)glycolamide was obtained as a white crystalline solid having a melting point of 71°–72° C. The structure was confirmed by infrared analysis.

The apparatus used for cyclodehydration was a column 10″ long by 1″ diameter, one end of the column being attached to a flask by means of a Claisen head and the other end of the column connected to a receiving vessel by means of a side arm. The column sloped downward at a slight angle from the Claisen head to the receiving vessel. Independent heating means were used to heat the flask and column. The receiving vessel was immersed in a cooling bath. The flask was provided with a gas inlet tube so that a stream of nitrogen could be passed into the liquid charge contained in the flask. The side arm between the column and the receiving vessel was attached to a vacuum pump.

The column described above was filled with 75.3 grams of kaolin, a clay containing about 40% alumina and about 55% silica, and heated to 280° C. 150 parts of N-(β-hydroxyethyl)glycolamide, as prepared above, was charged to the flask and a nitrogen pressure of 3–4 mm. Hg established in the system. The vapor stream from the flask was fed over the heated catalyst and condensed in the chilled receiving flask.

A 17% yield of 2-hydroxymethyl-2-oxazoline was obtained as a solid having a melting point of 132–133° C. The structure was confirmed by infrared analysis.

Elemental analysis was as follows.

Calculated for $C_4H_7NO_2$ (percent): C=47.5, H=6.9, and N=13.9. Found (percent): C=47.3, H=6.8, and N=13.8.

Other oxazolines within the scope of this invention having different hydroxyalkyl substituents on the 2-position are obtained by replacing the glycolic acid with an equal number of mols of another suitable acid. Illustrative of other suitable acids and the 2-substituents thus obtained are 5-hydroxyvaleric acid to give the substituent —(CH$_2$)$_4$OH, 11-hydroxyundecylic acid to give $$-(CH_2)_{10}-OH$$

ricinoleic acid to give the substituent

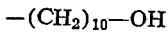

β-hydroxyvaleric acid to give the sustituent

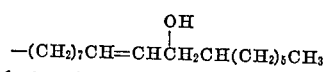

18-hydroxyoctadecanoic acid to give the substituent $$-(CH_2)_{17}OH$$

12-hydroxyoctadecanoic acid to give the substituent

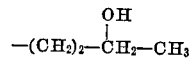

and the acid

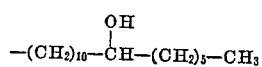

to give the substituent —(CF$_2$)$_3$—CH$_2$OH.

The 2-hydroxyalkyl-5,6-dihydro-1,3,4-oxazines of this invention are obtained by replacing the ethanolamine used in the above procedure with an equivalent number of mols of 3-aminopropanol.

EXAMPLE 2

131.5 parts of caprolactone, 73.8 parts of ethanolamine and 435 ml. of chloroform were charged to a flask and heated at reflux for 8 hours. The mixture formed two layers. The solvent was removed from the organic layer under vacuum and the solid product washed with ether and dried. N-(β-hydroxyethyl) - 6 - hydroxycaproamide was obtained as a white solid in 93% yield. After recrystallization from dioxane, it had a melting point of 75.5°–76.5° C.

The column as described in Example 1 was filled with 88.5 grams of kaolin catalyst and heated to 275° C. 196 parts of N-(β-hydroxyethyl)-6-hydroxycaproamide as prepared above was charged to the flask and a nitrogen pressure of 2–3 mm. Hg was established in the system. The amide was distilled through the column over a 4.5 hour period.

2-(5-hydroxypentyl)-2-oxazoline was obtained in 50% yield. The product was redistilled over a spinning band column to give a pale yellow liquid having a boiling point of 88°–88.5° C./0.02 mm. Hg and an index of refraction $n_D^{21°C} = 1.4745$. The structure was confirmed by infrared analysis.

Elemental analysis was as follows.

Calculated for $C_8H_{15}NO_2$ (percent): C=61.1, H=9.6, and N=8.9. Found (percent): C=61.2, H=9.8, and N=9.4.

EXAMPLE 3

6.58 parts of the 2-(5-hydroxypentyl)-2-oxazoline prepared in Example 2 was distilled into a polymerization tube containing 0.044 part of the perchlorate salt of 2-(p-chlorophenyl)-2-oxazoline (monomer/catalyst mol ratio of 269/1) and the tube was sealed under reduced pressure. The tube was placed in an oven and heated for 2 hours at 100° C. and 2.5 hours at 160° C. A clear orange solid polymer was obtained. The polymer was insoluble in chloroform, methanol, m-cresol, dimethyl formamide, formic acid and cold concentrated sulfuric acid. This insolubility indicated that the polymer was cross linked.

By substituting the monomers described in Example 1 for the 2-(5-hydroxypentyl)-2-oxazoline employed in the above procedure, one obtains polymeric materials having structures corresponding to the monomers employed.

It will be apparent that many modifications and variations may be effected without departing from the scope of the novel concepts of the present invention, and the illustrative details disclosed are not to be construed as imposing undue limitations on the invention.

We claim:

1. A crosslinked polymer formed by heating a monomer having the structure:

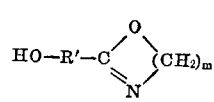

where R' is an alkyl or halogenated alkyl group of 1 to 17 carbon atoms or an alkenyl or halogenated alkenyl group of 4 to 17 carbon atoms, and m is 2 or 3, in the persence of a cationic catalyst at a temperature of 25°–250° C.

2. A polymer in accordance with claim 1 wherein said catalyst is a member selected from the group consisting of alkyl halides, boron-fluorine compounds, antimony-fluorine compounds, strong acids, salts of strong acids with an oxazoline or an oxazine, esters of strong acids, strongly acidic ion exchange resins and acid-activated clays.

3. A polymer in accordance with claim 1 wherein m is 2 and wherein R' is an alkyl or halogenated alkyl group of 5 to 17 carbon atoms.

4. A polymer in accordance with claim 1 wherein said monomer is 2-(5-hydroxypentyl)-2-oxazoline.

References Cited

UNITED STATES PATENTS

| | | | |
|---|---|---|---|
| 2,372,409 | 3/1945 | Tryon | 260—307 |
| 3,458,456 | 7/1969 | Levy et al. | 260—2 |

FOREIGN PATENTS

| | | |
|---|---|---|
| 666,828 | 11/1965 | Belgium. |

OTHER REFERENCES

Seeliger et al., "Angewandte Chemie, International Ed.," vol. 5, October 1966, pp. 875–888; pp. 880–883 only need.

Seeliger, German application 1,206,585, printed Dec. 9, 1965.

Wehrmeister, Chemical Abstracts, vol 63, col. 610 (1965).

SAMUEL H. BLECH, Primary Examiner

U.S. Cl. X.R.

260—80, 244, 307, 561